United States Patent [19]

Olsson

[11] 4,190,494
[45] Feb. 26, 1980

[54] SPACER WITH POLYGONAL INTERCONNETORS

[75] Inventor: Torsten Olsson, Västerås, Sweden

[73] Assignee: Aktiebolaget ASEA-ATOM, Västerås, Sweden

[21] Appl. No.: 889,304

[22] Filed: Mar. 23, 1978

[30] Foreign Application Priority Data

Dec. 21, 1977 [SE] Sweden .............................. 7714562

[51] Int. Cl.² ............................................. C21C 3/30
[52] U.S. Cl. ........................................ 176/76; 176/78
[58] Field of Search ................................... 176/76, 78

[56] References Cited

U.S. PATENT DOCUMENTS

| 3,261,758 | 7/1966 | Maldague et al. | 176/78 X |
| 3,301,764 | 1/1967 | Timbs et al. | 176/76 X |
| 3,301,765 | 1/1967 | Eyre et al. | 176/76 X |
| 3,439,737 | 4/1969 | Boorman et al. | 176/76 X |
| 3,457,140 | 7/1969 | Glandin | 176/78 |
| 3,772,148 | 11/1973 | Seddon | 176/78 |
| 3,806,410 | 4/1974 | Ripley | 176/78 |
| 4,077,843 | 3/1978 | Patterson et al. | 176/78 X |

FOREIGN PATENT DOCUMENTS 962266   7/1964   United Kingdom ...................... 176/78

*Primary Examiner*—Peter A. Nelson
*Attorney, Agent, or Firm*—Pollock, Vande Sande & Priddy

[57] ABSTRACT

A spacer assembly for vertically supporting a bundle of fuel rods, wherein the spacer assembly comprises a plurality of separate cells each surrounding a separate fuel rod. Each cell includes a pair of polygonally shaped members interconnected by at least one spring assembly, wherein the spring assembly provides a horizontal component of motion to cooling water circulating vertically through the bundle of fuel rods.

9 Claims, 9 Drawing Figures

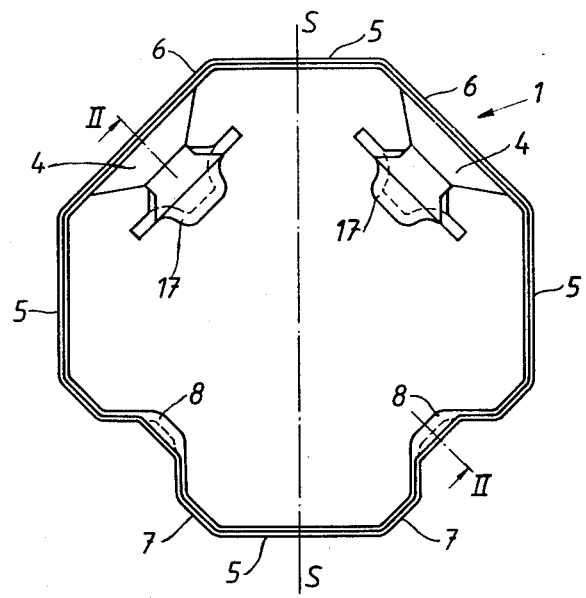
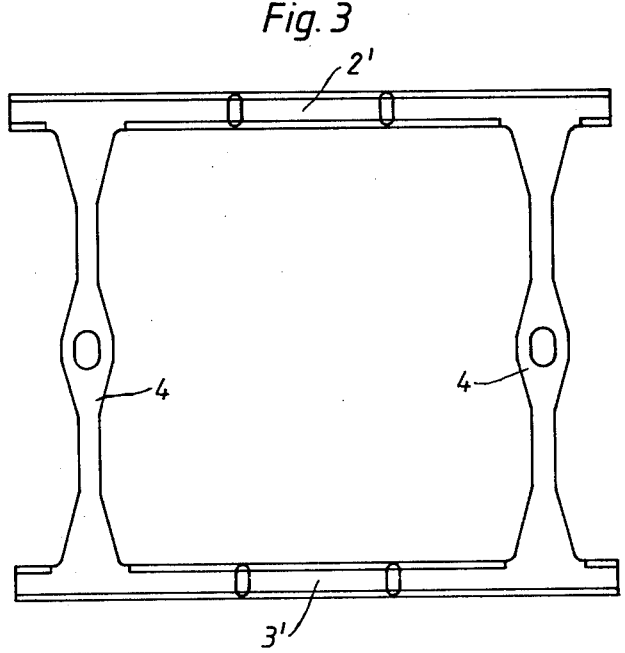

SPACER WITH POLYGONAL INTERCONNETORS

BACKGROUND OF THE INVENTION

The present invention relates to a spacer for a plurality of fuel rods, arranged vertically in a nuclear reactor, comprising a plurality of mutually equal cells which are each intended for one fuel rod, each cell only having one vertical symmetry plane and comprising an upper and a lower polygon ring, which are interconnected by means of at least one oblong spring, each polygon ring containing a plurality of polygon sides formed from vertical sheet metal portions, among them four connecting sides which are parallel in pairs and which are each welded to a connecting side in a corresponding adjacent cell, said spring being constructed with a middle portion lying in a vertical plane with a contact projection directed towards the vertical axis of the cell.

A spacer of this general type is suggested in British Pat. No. 1,480,649.

In a nuclear reactor it is inevitable that certain fuel rods in a fuel bundle give a higher thermal power than the remaining fuel rods. It is known to provide a spacer with deflection screens in order to supply cooling water flowing along a fuel rod with a horizontal speed component, so that the cooling water from fuel rods a with relatively high power can be mixed with cooling water from fuel rods with lower power already in the vicinity of the lower end of the fuel bundle. However, such deflection screens have the disadvantage that, if used to a large extent, they result in a considerable increase in the coefficient of pressure fall of the spacer. In addition, deflection screens increase the amount of neutron-absorbing material.

OBJECT OF THE PRESENT INVENTION

The above-mentioned drawbacks are avoided with a spacer formed according to the present invention by wherein the spacer cell is constructed in such a manner that a horizontal deflection of the bypassing water is accomplished without particular deflection screens and with a relatively low value for the coefficient of pressure fall of the spacer. According to a further feature of the invention, the spacer cells are orientated with respect to each other in a manner which provides a particularly efficient mixing of cooling water within each fuel bundle.

BRIEF DESCRIPTION OF THE DRAWINGS

The present invention will be described with reference to the accompanying schematic drawings, in which FIG. 1 shows a top view of a spacer cell formed according to the invention;

FIG. 3 shows a punched-out sheet billet bendable into the shape shown in FIGS. 1 and 2.

DETAILED DESCRIPTION OF THE PREFERRED EMBODIMENTS

Figure 2:
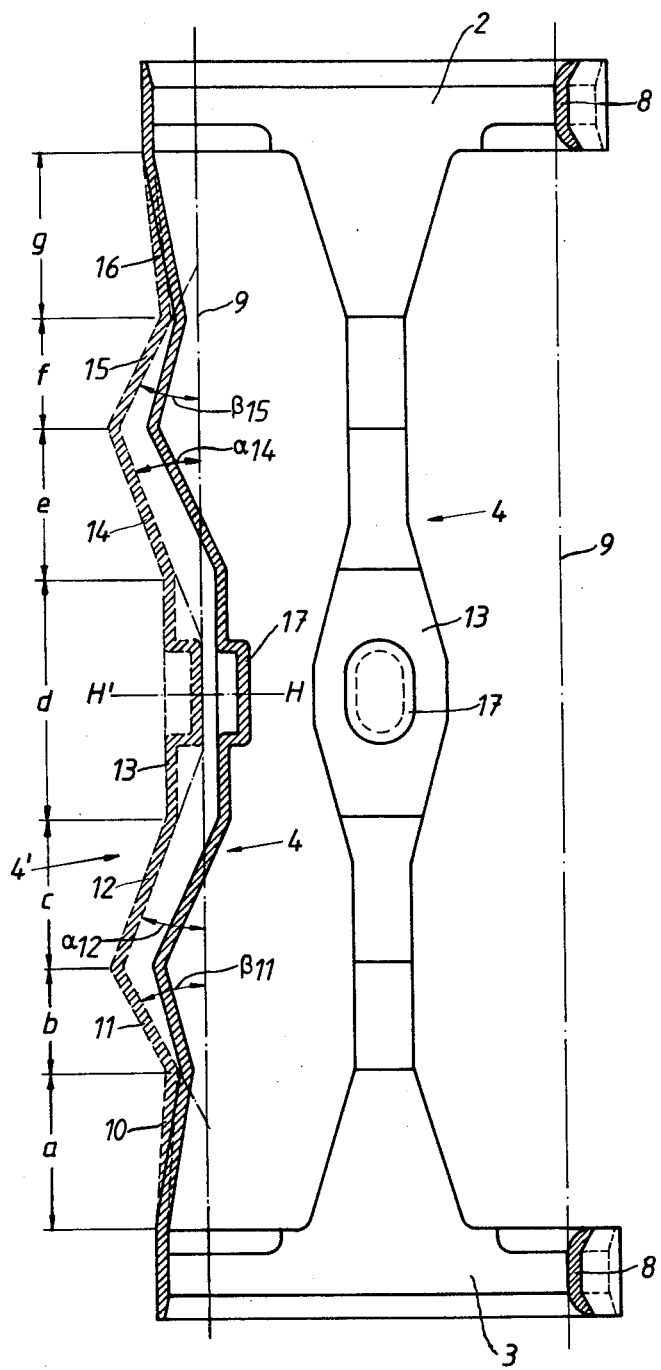
FIG. 2 shows a section along II—II of FIG. 1.

The spacer cell shown in FIGS. 1 and 2 comprises an upper polygonal 2 and a lower polygonal ring 3, the polygonal sides of which consist of sheet metal portions arranged in a vertical plane. The two polygonal rings are mutually interconnected by two oblong, mutually equal sheet metal springs $4a$.

As shown in FIG. 3, a punched-out billet of springs 4 is formed integrally with the sheet portions 2' and 3' from which the polygonal rings have been formed through a bending operation. Spacer cell 1 has only one vertical symmetry plane. This is indicated by the dash-dotted line S—S in FIG. 1. Each polygonal ring has four equally long, pairwise parallel connecting sides 5 which, during the assembly of several spacer cells into one spacer, are each welded to a connecting side in a corresponding adjacent spacer cell 1, or with an adjoining side of a frame plate, as well as two attachment sides 6 which are each positioned at different ends of one and the same connecting side, which each of the attachment sides forming attachments for a sheet spring 4. Two polygonal sides 7, are each arranged in front of a corresponding attachment side 6, and are furnished, by embossing, with individual contact projections 8 intended to make contact in a resilient manner with a fuel rod surrounded by the spacer cell. The fuel rod is indicated in FIG. 2 by two dash-dotted lines 9.

In FIG. 2 a sheet spring is shown in the position and shape it assumes when the spacer cell surrounds a fuel rod. This sheet spring is designated 4' and is drawn with dashed lines. Sheet spring 4' is substantially symmetrical about a horizontal symmetry plane along H—H. The sheet springs are designed with varying widths, the width of the spring being adapted to the bending moment in such a manner that the flexural stress is substantially constant along the length of the spring. For the purpose of achieving a small coefficient of pressure fall, spring portions having the widths larger than the minimum width are substantially formed to lie in a vertical plane when a fuel rod is present in the spacer cell, or to make an angle of at the most 10° with a vertical plane which is cut along a horizontal line. In FIG. 2 such spring portions are designated 10, 13 and 16 and their vertical extension a, d and g, respectively.

Spring 4' has a middle portion 13 which lies in a vertical plane and which is provided with an embossed contact projection 17 which transmits the spring force to the fuel rod 9. At each end the middle portion 13 is directly connected to an obliquely extending spring portion 12 and 14, respectively, which is bent in a direction away from the fuel rod 9. Portion 12 is directly connected to an obliquely extending spring portion 11 which is bent in the opposite direction. In a corresponding manner portion 14 is directly connected to an obliquely extending spring portion 15 which is bent in the opposite direction. Since spring portions 12 and 14 are closer to the horizontal central plane H—H than spring portions 11 and 15, portions 12 and 14 are referred to in the following as "axially inner oblique spring portions" and portions 11 and 15 are referred to as "axially outer oblique spring portions".

Spring portions 12 and 14 make the angle $\alpha_{12}$ and $\alpha_{14}$, respectively, with the vertical plan in which middle portion 13 lies, and portions 11 and 15 make angle $\beta_{11}$ and $\beta_{15}$, respectively, with the same vertical plane. Each of the above angles is greater than 20°. With regard to the desired deflecting effect, it is sufficient in certain cases to require that these angles, or at least one of them shall be greater than 15°.

Experimental investigations have shown that the temperature distribution among the fuel rods in a fuel bundle is unusually advantageous when the fuel bundle is provided with a spacer according to the invention. The reason for this is probably to be found in the fact that the spacer has the ability to supply a horizontal velocity component to cooling water that passes the spacer. This can be explained by comparing the deflecting effect of each oblique spring portion in the lower half of spring 4' with the corresponding effect in the upper half. The spring side facing the fuel rod is referred to as the "front side" and the other spring side as the "back side". The water flowing along the back side of portion 11 is to a large extent supplied with the help of spring portion 10 which, together with an attachemnt side of the polygonal ring 3, provides favourable inflow conditions so that the change of direction of the water can be made in a turbulence free manner and with relatively slight energy loss. When the water leaves the back side of spring portion 11, it has a relatively great horizontal velocity component in a direction away from the fuel rod 9. Water flowing along the front side of spring portion 15 has comparatively less favourable inflow conditions and leaves spring portion 15 with a smaller horizontal velocity component.

A similar comparison between spring portion 12 and spring portion 14 shows that the latter provides the greatest horizontal deflection.

Another reason why a spring 4' results in greater horizontal deflection inone direction than in the other is the fact that there is a water space with relatively great horizontal extension on the back side of the spring, while the distance between the spring and the fuel rod is very short. This results in water, directed towards the fuel rod from the front side of the spring, being reflected with oppositely directed horizontal velocity component, or, at any rate, it loses part of its kinetic energy at the wall of the fuel rod.

As is clear from FIG. 1, each polygonal ring 2 and 3 has four equally long connecting sides 5, which are parallel in pairs, the sides being arranged with the same distance between the parallel sides. This means that each spacer cell has four possible directions of orientation. By orienting the different spacer cells in a suitable manner, a favourable collaboration can be achieved between the horizontal velocity components of the different cells.

Figure 4:
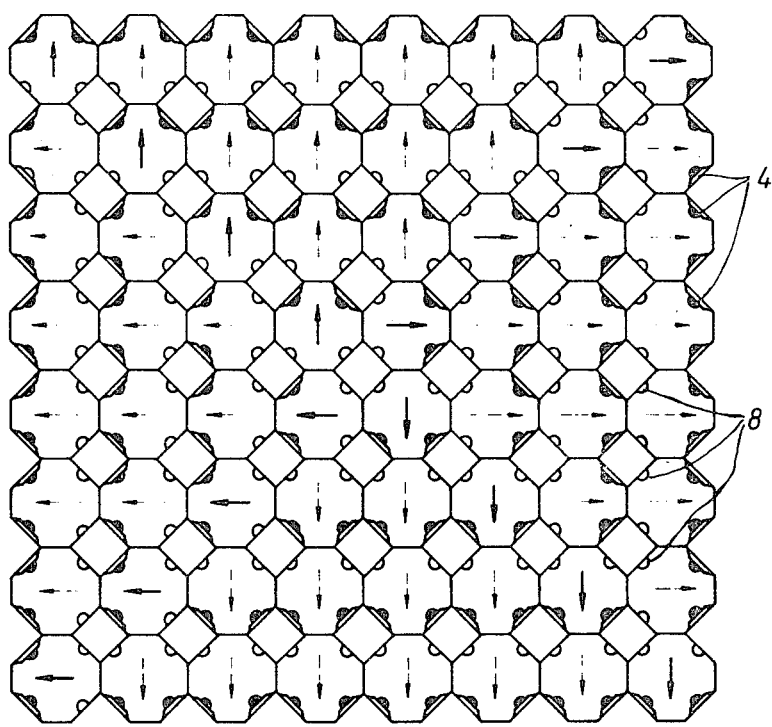
FIGS 4 and 5 show top views of first and second employments of the spacer formed according to the preferred embodiment.

One example of a suitable cell orientation is shown in FIG. 4, in which the resultant horizontal velocity component in each cell is indicated by an arrow. The velocity components indicated by dashed arrows counteract and balance each other and thus do not give rise to any circular water motion in a fuel assembly, the spacer of which is designed according to FIG. 4. The other components, shown by continuous arrows, on the other hand, cooperate with each other, which results in the water flowing through a fuel assembly assuming a screw-lined course. This results in an efficient stirring of the fuel assembly and a corresponding decrease of the temperature of the fuel rods working with the highest thermal power, which means that the reactor can be driven with higher maximum output.

It is clear from Fig. 4. that the effectively cooperating components respresent spacer cells, which are positioned along the diagonals in a substantially square spacer. Stirring can also be brought about if some of these cells have a different orientation. The spacer contains a plurality of coaxial square rings, the thickness in horizontal direction of which being equal to a cross measure of a polygon ring in the cell, namely, the distance between two parallel polygonal sides. Stirring is achieved if at least one square ring exhibits at least three corner cells with mutually different directions of orientation.

Figure 5:
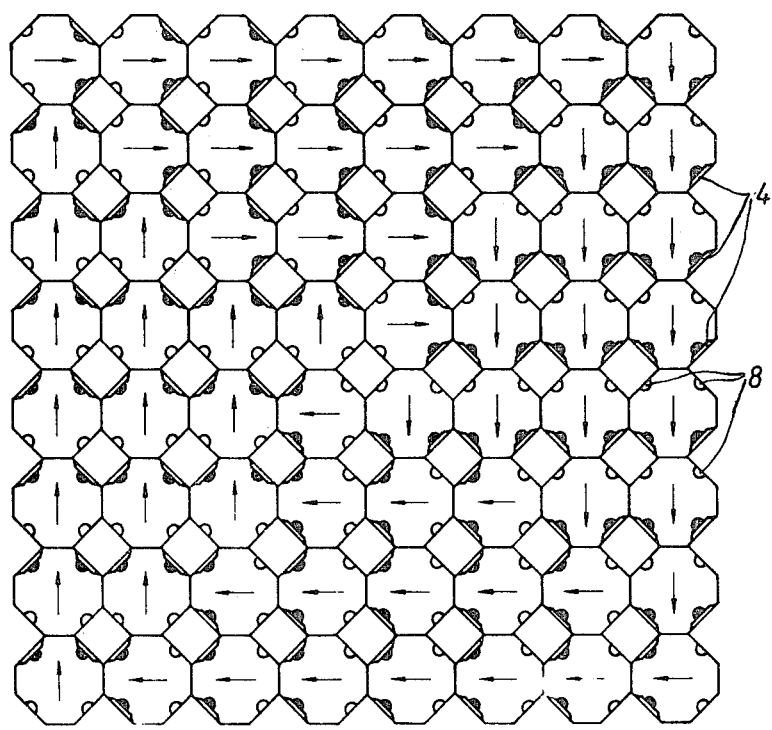
Figure 6:
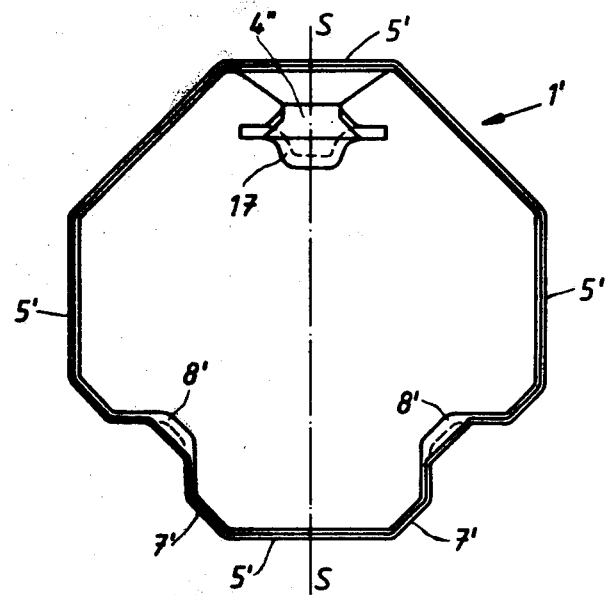
FIG. 6 shows a top view of a spacer cell formed according to an alternative embodiment of the present invention.
Figure 7:
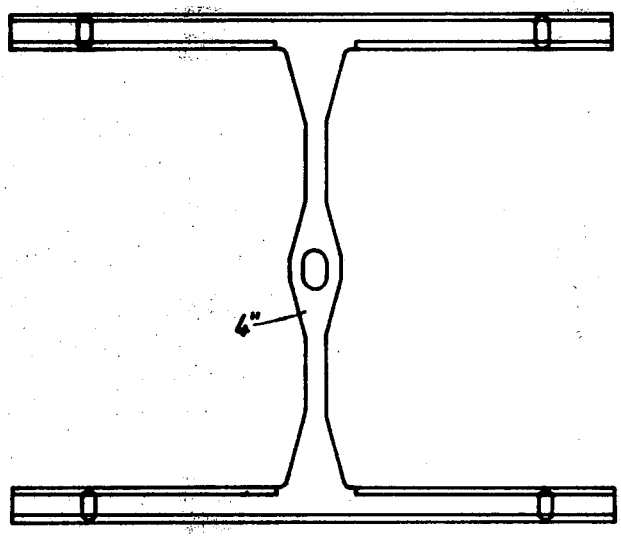
FIG. 7 shows a punched-out sheet billet bendable into the shape shown in FIG. 6.

According to another embodiment of the invention, the cells of a square spacer are orientated as shown in FIG. 5. The spacer comprises a plurality of coaxial square rings in the same way as in FIG. 4. Certain structural deviations can be accepted. Stirring is achieved if at least three square sides of at least one of the square rings are made with one and the same orientation in a predominant number of the cells of the square side, at least three square sides being different regarding the predominant cell orientation.

In FIGS. 6 to 9, 4" designates a spring which, in a fuel rod in the spacer cell, has the same shape as spring 4 in FIGS. 1 to 5 under equal conditions. In other respects, details in FIGS. 6 to 9 are designated with the same numerals as corresponding details in FIGS 1 to 5, but using apostrophization of these numbers.

Figure 8:
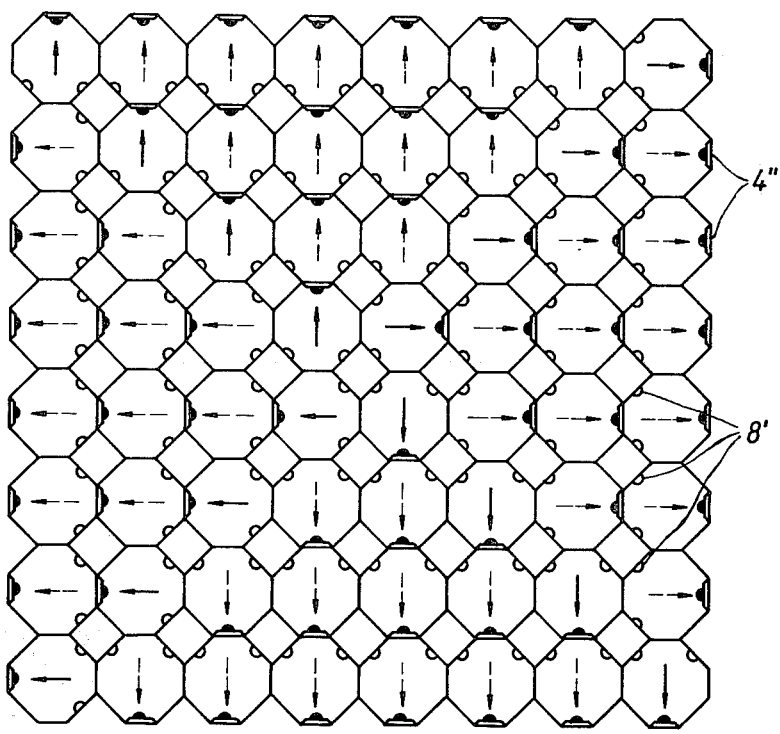
FIGS. 8 and 9 show top views of first and second employments of the spacer formed according to the alternative embodiment of the invention.
Figure 9:
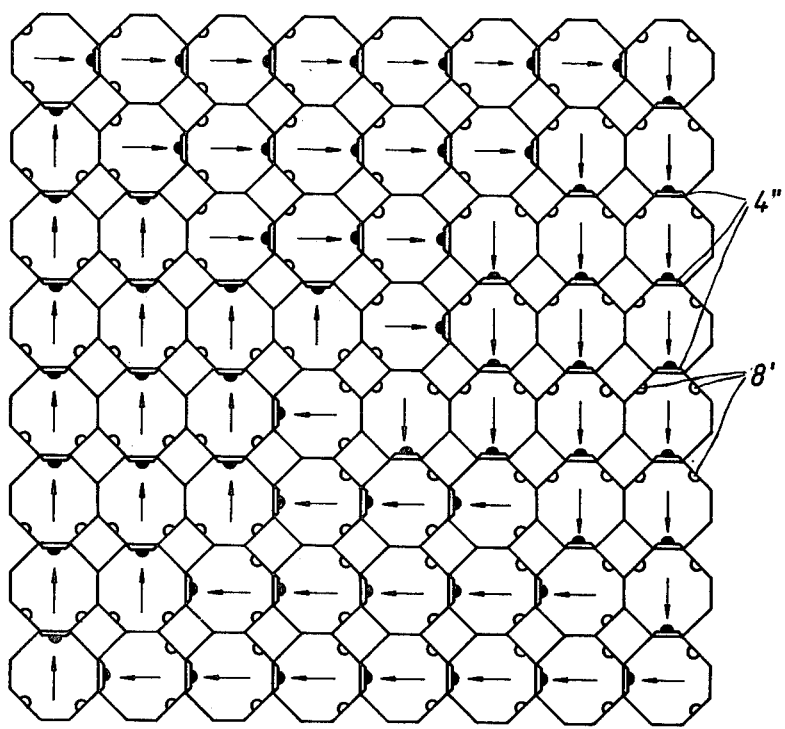

Also in the case of one and the same orientation of all the spacer cells, it may be taken into account that a spacer according to the invention results in a non-negligible cross flow within the fuel assembly, the arrangements shown in FIGS. 4 and 5 and in FIGS. 8 and 9, however, being considerably more favourable.

I claim:

1. A spacer assembly for supporting a plurality of vertically arranged fuel rods while efficiently mixing a cooling medium horizontally therethrough, said spacer assembly comprising:

at least one spacer cell having similar upper and lower polygonally shaped members interconnected by at least one oblong spring assembly, said polygonally shaped members adaptable for surrounding and supporting an individual fuel rod extending therethrough;

said spring assembly including a middle portion lying substantially within a vertical plane extending through said spacer assembly, said middle portion being biased into supporting contact with said fuel rod;

substantially straight upper and lower spring members joining said upper and lower polygonally shaped members with said middle portion;

said upper and lower spring members each including a first substantially straight section attached to a respective polygonal member and extending toward said fuel rod, said upper and lower spring members each including a second substantially straight section attached to said middle portion and extending away from said fuel rod and further including a third substantially straight section joining said first and second sections to form a pair of oblique angles therebetween;

whereby a vertically flowing cooling medium located adjacent to said fuel rod is provided with a net horizontal flow component directed away from said fuel rod.

2. Spacer according to claim 1, wherein the plurality of cells comprising the spacer assembly are arranged with at least two different directions of orientation.

3. Spacer according to claim 2, wherein the plurality of cells comprising the spacer form a plurality of coaxial square rings, arranged immediately inside each other and being connected with each other, the thickness of said rings in a horizontal direction being equal to a cross measure of said polygon ring, with at least one square ring having at least three corner cells with mutually different directions of orientation.

4. Spacer according to claim 2, wherein the plurality of cells comprising the spacer are arranged to form a plurality of coaxial square rings, arranged immediately inside each other and being connected with each other, the thickness of said rings in a horizontal direction being equal to a cross measure of a said polygonal ring, and at least three square sides of at least one of said square rings are each made with one and the same orientation for a predominant number of cells of the square side, with at least three square sides being different with regard to the predominant cell orientation.

5. Spacer according to claim 1, characterised in that said upper and lowerpolygonally shaped members are interconnected by two oblong spring assemblies and that each of said polygonal members comprises two attachment sides lying at different ends of a said connecting side, with said attachment sides forming attachments for said oblong spring assemblies.

6. A spacer assembly according to claim 1, wherein said upper and lower polygonal ring members each includes at least a first pair of connecting sides spaced from and extending substantially parallel to one another and a second pair of connecting sides spaced from and extending substantially parallel to one another.

7. A spacer assembly according to claim 1, wherein said assembly comprises a plurality of similarly shaped spacer cells positioned adjacent to and adaptable for attachment with one another.

8. A spacer assembly according to claim 1, wherein one of said second and third substantially straight spring sections forms an angle of greater that 15° as measured from said vertical plane extending through said middle portion.

9. A spacer assembly according to claim 1, wherein said second and third spring sections provide a total vertical extension of more than 25% of the vertical extension of the spacer assembly.

* * * * *